(12) United States Patent
DeLuca et al.

(10) Patent No.: US 9,307,374 B2
(45) Date of Patent: Apr. 5, 2016

(54) TRANSFERRING INFORMATION ON A FIRST MOBILE COMPUTING DEVICE TO A PEER MOBILE COMPUTING DEVICE

(71) Applicant: International Business Machines Corporation, Armonk, NY (US)

(72) Inventors: Lisa Seacat DeLuca, Baltimore, MD (US); Boaz Mizrachi, Haifa (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 338 days.

(21) Appl. No.: 13/921,272

(22) Filed: Jun. 19, 2013

(65) Prior Publication Data
US 2014/0378097 A1    Dec. 25, 2014

(51) Int. Cl.
| | |
|---|---|
| *G06F 7/04* | (2006.01) |
| *H04L 29/06* | (2006.01) |
| *H04L 9/32* | (2006.01) |
| *H04M 1/66* | (2006.01) |
| *H04W 4/16* | (2009.01) |
| *H04W 12/08* | (2009.01) |
| *H04W 8/20* | (2009.01) |
| *G06F 21/31* | (2013.01) |

(Continued)

(52) U.S. Cl.
CPC *H04W 4/16* (2013.01); *H04W 8/20* (2013.01); *H04W 12/08* (2013.01); *G06F 21/31* (2013.01); *G06F 21/6218* (2013.01); *H04L 63/08* (2013.01); *H04W 12/06* (2013.01); *H04W 12/12* (2013.01)

(58) Field of Classification Search
CPC ..... G06F 21/31; G06F 21/6218; H04L 63/08; H04W 12/12; H04W 12/06; H04W 12/08
USPC ............... 726/7; 713/165, 168; 455/410, 411
See application file for complete search history.

(56) References Cited

U.S. PATENT DOCUMENTS

| | | | |
|---|---|---|---|
| 7,065,575 B1 | 6/2006 | Machiraju et al. | |
| 8,655,307 B1* | 2/2014 | Walker .............. | H04W 52/0212 455/343.5 |

(Continued)

FOREIGN PATENT DOCUMENTS

EP    1024626 A1    2/2000

OTHER PUBLICATIONS

U.S. Appl. No. 13/585,038, entitled Automatically Connecting to a Best Available Calling Device Based on Resource Strength filed Aug. 14, 2012.

(Continued)

*Primary Examiner* — Aravind Moorthy
(74) *Attorney, Agent, or Firm* — Catherine Ivers; Andrew M. Calderon; Roberts Mlotkowski Safran & Cole, P.C.

(57) ABSTRACT

The program code identifies a problem with a first mobile computing device, wherein the problem is capable of preventing completion of an action attempted by a first end-user via the first mobile computing device. In response to identifying the problem, the program code determines the first end-user wants to complete the action on a first peer mobile computing device of a second end-user. The program code scans a computer network to identify the first peer mobile computing device and other peer mobile computing devices on which to complete the action. The program code grants access to a copy of information to complete the action on the first peer mobile computing device. The program code revokes access to the copy of information.

20 Claims, 5 Drawing Sheets

(51) Int. Cl.
  *H04W 12/06* (2009.01)
  *G06F 21/62* (2013.01)
  *H04W 12/12* (2009.01)

(56) References Cited

U.S. PATENT DOCUMENTS

| | | | |
|---|---|---|---|
| 2012/0079086 A1 | 3/2012 | Miettinen | |
| 2012/0309425 A1* | 12/2012 | El Khayat et al. | 455/456.3 |
| 2013/0303154 A1* | 11/2013 | Gupta | G06F 21/56 455/423 |
| 2013/0347064 A1* | 12/2013 | Aissi | 726/2 |

OTHER PUBLICATIONS

Negash et al., "A Context Aware Information Sharing Middleware for a Dynamic Pervasive Computing Environment", IADIS International Journal on Computer Science and Information Systems, vol. 2, No. 2, pp. 65-82, ISSN: 1646-3692, 2007.

Bump Technologies Inc., Product: "Bump-Android Apps on Google Play", retrieved on May 31, 2013, retrieved from website: https://play.google.com/store/store/apps/details?id=com.bumptech.

* cited by examiner

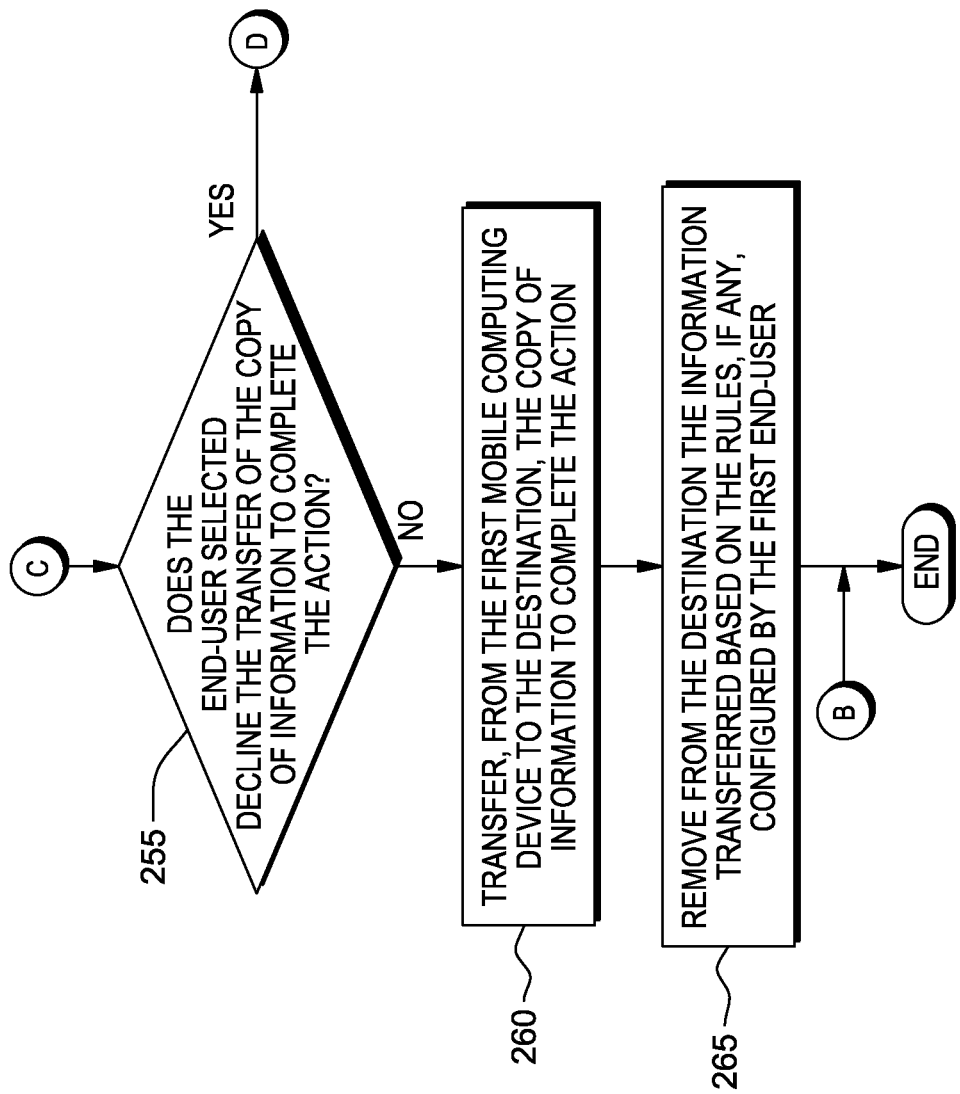

TRANSFERRING INFORMATION ON A FIRST MOBILE COMPUTING DEVICE TO A PEER MOBILE COMPUTING DEVICE

BACKGROUND

1. Field of the Invention

The present invention relates generally to mobile computing software, and more specifically to mobile computing data transfer software for transferring a copy of information from a first mobile computing device to a peer mobile computing device upon the mobile computing data transfer software identifying a problem with the first mobile computing device that may prevent an end-user from completing an action on the first mobile computing device.

2. Description of the Related Art

Battery depletion or component failure of a mobile computing device oftentimes occurs before or while an end-user is utilizing the mobile computing device to perform an action such as placing a call, browsing the Internet, or sending an e-mail. The battery depletion or component failure of the computing device can prevent the end-user from completing the action. In particular, if the end-user was intending to engage in a conversation (e.g., a voice or a text conversation) at the time of the battery depletion or component failure, then the end-user typically has at least three options for completing the conversation.

As a first option, the end-user can charge the battery of the mobile computing device if a charger for the battery of the mobile computing device is readily available. As a second option, if a person having another mobile computing device is next to the end-user, then the end-user can ask the person for permission to use the mobile computing device of that person. Otherwise, if the end-user is forewarned of the battery depletion or component failure, then as a third option the end-user can write down information (e.g., contact information) before the computing device is no longer usable due to the battery depletion or component failure. However, a battery charger may not be readily available, a person having another mobile computing device may not be nearby, or the end-user may not be able to write down all the information on time. Thus, various things can go awry that prevent the end-user from being able to complete the conversation.

Furthermore, if things do go awry that prevent the end-user from being able to complete the conversation it is known for the end-user to enter a key combination to transfer a current ongoing call on a first mobile computing device to another call on a second mobile computing device. However, for the transfer of the ongoing call to be successful between the first and second mobile computing devices, then both the first and second mobile computing devices must be pre-configured to be associated as backups for each other. Moreover, even if the transfer of the ongoing call from the first mobile computing device is successful only the active call is transferred, but other important information that the end-user may need to complete an action may not be transferred.

SUMMARY

Aspects of an embodiment of the present invention disclose a method, computer system, and program product for transferring a copy of information from a first mobile computing device to a peer mobile computing device upon the mobile computing data transfer software identifying a problem with the first mobile computing device that may prevent an end-user from completing an action on the first mobile computing device. A computer identifies a problem with a first mobile computing device, wherein the problem is capable of preventing completion of an action attempted by a first end-user via the first mobile computing device. The computer determines the first end-user wants to complete the action on a first peer mobile computing device of a second end-user, based on the problem identified. The computer scans a computer network to identify the first peer mobile computing device and other peer mobile computing devices on which to complete the action. The computer grants access to a copy of information to complete the action on the first peer mobile computing device. The computer revokes access to the copy of information.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

FIGS. 2A-2C are flowcharts illustrating operations of the program code according to an embodiment of the present invention.

DETAILED DESCRIPTION

Figure 1:
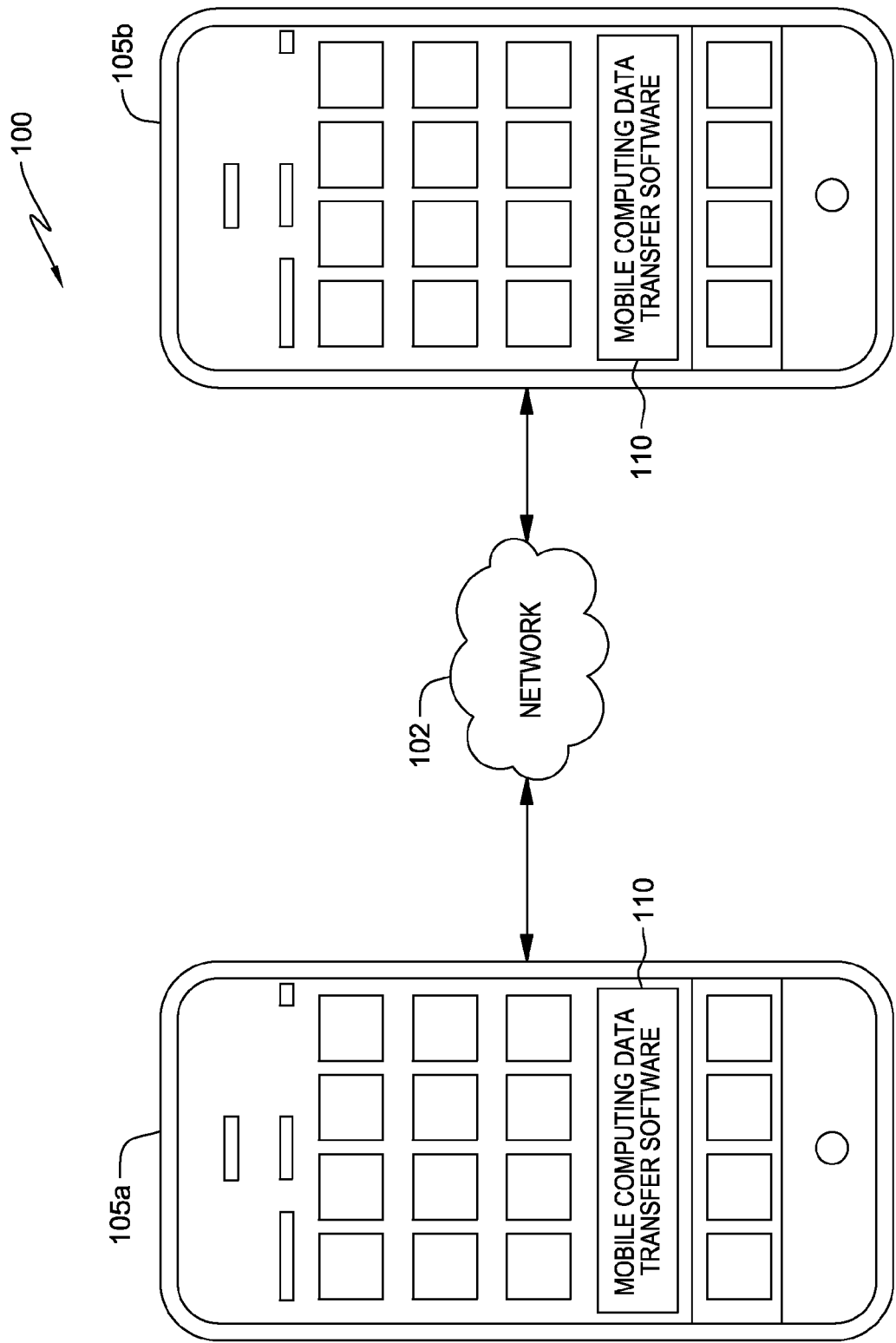
FIG. 1 is a block diagram of a distributed computer system, including a first mobile computing device and a peer mobile computing device each having mobile computing data transfer software, wherein the mobile computing data transfer software is program code that allows an end-user to transfer a copy of information from the first mobile computing device to the peer mobile computing device upon the mobile computing data transfer software identifying a problem with a component of the first mobile computing device according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide mobile computing data transfer software for transferring a copy of information from a first mobile computing device to a peer mobile computing device upon mobile computing data transfer software identifying a problem with the first mobile computing device that may prevent an end-user from completing an action on the first mobile computing device.

FIG. 1 illustrates computer system 100 that includes network 102, first mobile computing device 105a and second mobile computing device 105b each having mobile computing data transfer software 110 installed. Mobile computing devices 105a and 105b each include respective internal components 800a and 800b, and respective external components 900a and 900b, as described below in more detail with respect to FIG. 3. In embodiments of the invention, mobile computing data transfer software 110 can identify a problem with first mobile computing device 105a that is being utilized by a first end-user and upon identifying the problem, transfer (e.g., grant access to) a copy of information to a peer mobile computing device (e.g., second mobile computing device 105b) of a second end-user. A peer mobile computing device as used herein refers to any mobile computing device having data transfer software 110 installed, wherein an end-user that is logged into the peer mobile computing device can be configured to be within the first end-user's electronic address book. The electronic address book can include one or more of the following: email client address book contacts, employer directory contacts, and social networking contacts (e.g., Facebook® friends).

For example, data transfer software 110 can identify the following: if the battery for first mobile computing device 105a is nearly depleted by monitoring the battery life status indicator of first mobile computing device 105a, if the first end-user's service plan minutes (e.g., phone service plan minutes) are nearly depleted by monitoring the first end-user's service plan (e.g., phone service plan, Internet service plan) to determine the first end-user's available minutes, and other computer hardware and/or computer software component issues that can limit the availability of resources needed to complete performance of an action by the first end-user. Specifically, if data transfer software 110 on first mobile computing device 105a identifies that the battery for first mobile computing device 105a is nearly depleted (i.e., is about less than 10% of full capacity) or the first end-user's available minutes are nearly depleted, then data transfer software 110 on mobile computing device 105a can transfer a copy of information that is specified by the first end-user (e.g., a copy of contact information from an electronic address book of the first end-user) from first mobile computing device 105a to second mobile computing device 105b or to any other peer mobile computing device connected, via network 102, to first mobile computing device 105a. Therefore, if an end-user of first mobile computing device 105a is about to perform or is performing an action at the time data transfer software 110 identifies if the battery for first mobile computing device 105a is nearly depleted or if the end-user's available minutes are nearly depleted, then data transfer software 110 can transfer a copy of information that is specified by the first end-user from first mobile computing device to a peer mobile computing device (e.g., second mobile computing device 105b). The copy of information transferred is any information that can be utilized by the first end-user to complete the action on the peer mobile computing device.

Figure 2A:
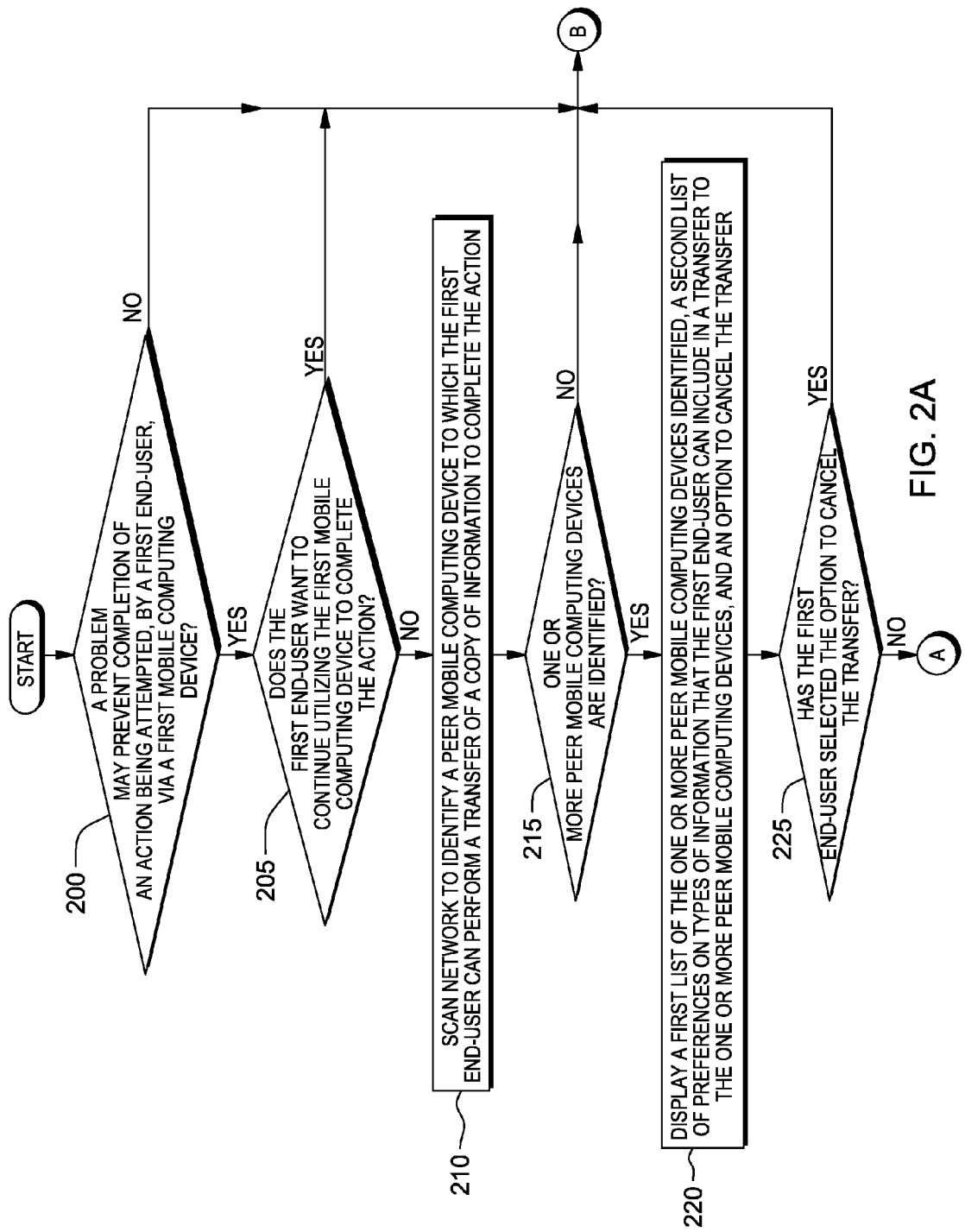
Figure 2B:
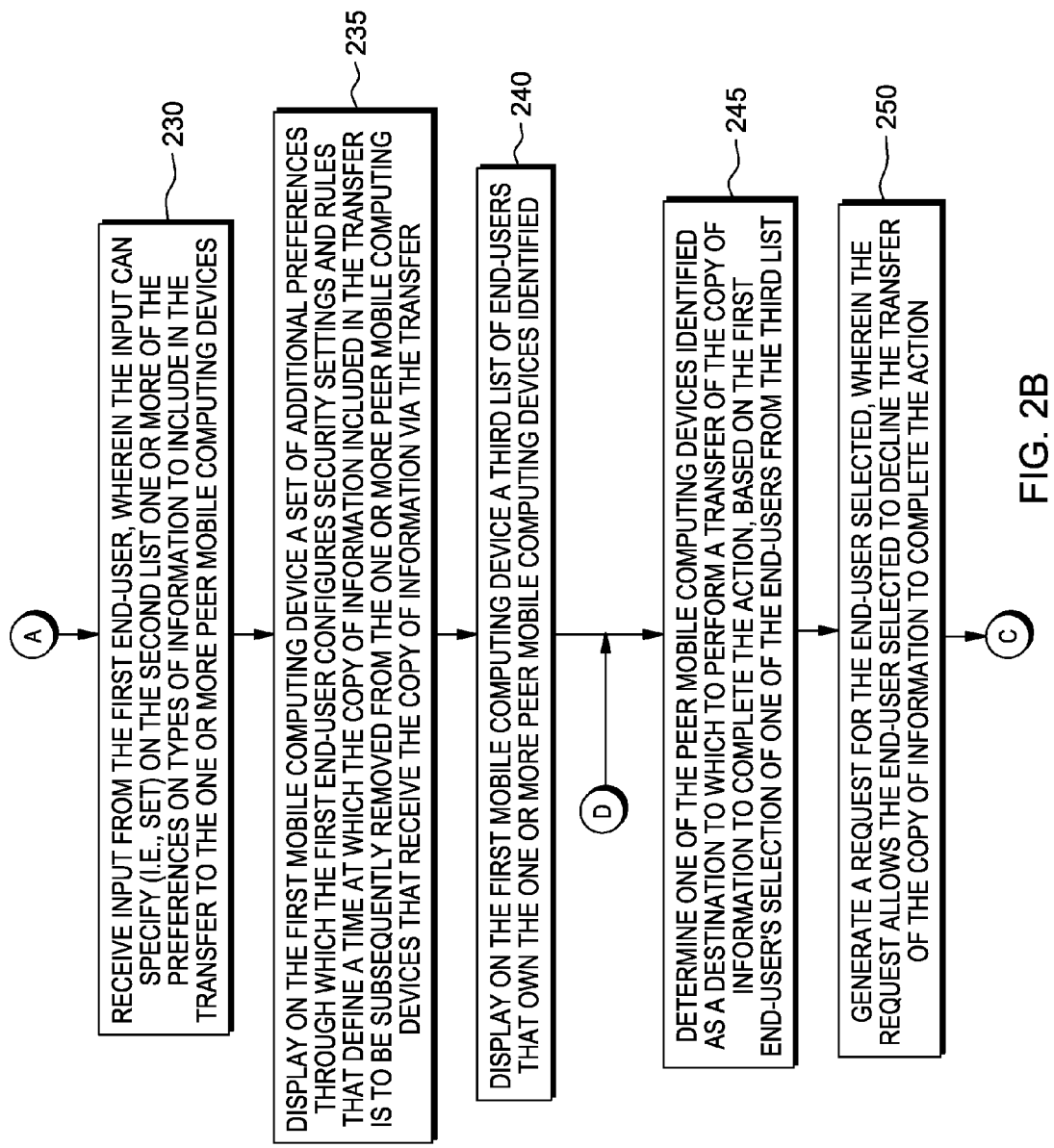

FIGS. 2A-2C are flowcharts illustrating the steps of the program code, data transfer software 110, for transferring (e.g., granting access to) a copy of information from first mobile computing device 105a to second mobile computing device 105b or any other peer a peer mobile computing device, upon data transfer software 110 identifying a problem with first mobile computing device 105a that may prevent an end-user from completing an action on first mobile computing device. In the disclosed embodiment, a first end-user is attempting to perform at least one of the following actions: place a call (i.e., a phone call or a video call), browse the Internet, and/or send an e-mail. The program code on first mobile computing device 105a determines if a problem may prevent completion (i.e., capable preventing completion) of an action being attempted, by a first end-user, via first mobile computing device 105a (decision block 200). Specifically, to determine if a problem may prevent completion of the action being attempted by the first end-user the program code identifies the following: if a battery for first mobile computing device 105a is nearly depleted by monitoring a battery life status indicator of first mobile computing device 105a, if the first end-user's service plan minutes (e.g., phone service plan minutes or Internet service plan minutes) are nearly depleted by monitoring the first end-user's service plan (e.g., phone service plan or Internet service plan) to compute the first end-user's available service plan minutes, and other computer hardware and/or computer software component issues that can limit the availability of resources needed to complete performance of the action being attempted by the first end-user.

If the program code does not determine a problem may prevent completion of an action being attempted, by the first end-user, via first mobile computing device 105a (the "NO" branch of decision block 200), then the first end-user can complete the action on first mobile computing device 105a and the program code ends. Otherwise, if the program code determines a problem may prevent completion of the action being attempted, by the first end-user, via first mobile computing device 105a (the "YES" branch of decision block 200), then the program code determines, based on input from the first end-user, if the first end-user wants to continue utilizing first mobile computing device 105a to complete the action (decision block 205). Specifically, to determine if the first end-user want to continue utilizing first mobile computing device 105a to complete the action the program code prompts the first end-user via a pop-up window through which the first end-user can select an option to perform a transfer of (e.g., grant access to) a copy of information from a first mobile computing device to a peer mobile computing device (e.g., mobile computing device 105b), or an option to continue utilizing first mobile computing device 105a to complete the action.

Thus, if the program code determines, based on the input from the first end-user, that the first end-user wants to continue utilizing first mobile computing device 105a to complete the action (the "YES" branch of decision block 205), then the program code ends. Otherwise, if the program code determines, based on the input from the first end-user, that the first end-user does not want to continue utilizing first mobile computing device 105a to complete the action (the "NO" branch of decision block 205), then the program code scans network 102 to identify a peer mobile computing device (e.g., second mobile computing device 105b) to which the first end-user can perform a transfer of a copy of information to complete the action (block 210). In other embodiments, the copy of information may transferred and stored on a computer managed by a data storage cloud service provider, wherein an end-user having a peer mobile computing device identified by the program code can be subsequently granted access to the copy of information in order for the first end-user to complete the action on the peer mobile computing device identified. If one or more peer mobile computing devices are not identified (the "NO" branch of decision block 215), then the program code ends. Otherwise, if one or more peer mobile computing devices are identified (the "YES" branch of decision block 215), then the program code displays a first list of the one or more peer mobile computing devices identified, a second list of preferences on types of information that the first end-user can include in a transfer to the one or more peer mobile computing devices, and an option to cancel the transfer (block 220).

If the program code determines, based on the input from the first end-user, that the first end-user has selected the option to cancel the transfer (the "YES" branch of decision block 225), then the program code ends. Otherwise, if the program code does not determine, based on the input from the first end-user, that the first end-user has not selected the option to cancel the transfer (the "NO" branch of decision block 225), then the program code continues. Next, the program code receives input from the first end-user, wherein the input can specify (i.e., set) on the second list one or more of the preferences on types of information to include in the transfer to the one or more peer mobile computing devices (block 230). Specifically, the input from the first end-user can specify on the second list one or more of the preferences, wherein the preferences can include at least one or more of the following options set by the first end-user: an option to transfer a copy of information that includes one or more contacts of the first end-user to the one or more peer mobile computing devices, an option to transfer a copy of information that includes a set of mobile computing software applications from first mobile computing device 105a to the one or more peer mobile computing devices, and an option to transfer a copy of information that includes a file from first mobile computing device 105a to the one or more peer mobile computing devices.

Next, the program code displays on first mobile computing device 105a a set of additional preferences through which the first end-user can configure security settings and rules that define a time at which the copy of information included in the transfer is to be subsequently removed from the one or more peer mobile computing devices that receive the copy of information via the transfer (block 235). For example the security settings can specify whether or not the copy of information received by the one or more peer mobile computing devices, via the transfer, is protected by a password in order to limit the persons to whom are granted access to the copy of information. Thus, if the security setting specify that the copy of information is protected by a password, and if the first end-user is the only person that has the password, then the first end-user will be the only person able to access the copy of information on the one or more peer mobile computing devices even though the computing devices may be owned by a different person other than the first end-user. In addition, the rules may define the following: the copy of information is to be removed upon first mobile computing device 105a regaining workable resource availability to complete the action, the copy of information is to be removed a number of minutes after the one or more peer mobile computing devices receive the copy of information, the copy of information is to be removed after the action is completed on at least one of the peer mobile computing devices, and/or the copy of information is to be removed subsequent to the program code receiving, via manual entry from an end-user, a unique code assigned to the copy of information. The unique code assigned to the copy of information can be randomly assigned by the program code subsequent to the transfer mentioned above. In the disclosed embodiment, the unique code can be a string of text.

Subsequent to the program code displaying the set of additional preferences through which the first end-user configures the security settings and the rules, the program code displays on first mobile computing device 105a a third list of end-users that own the one or more peer mobile computing devices identified (block 240). Next, the program code determines one of the peer mobile computing devices identified as a destination to which to perform a transfer of the copy of information to complete the action, based on the first end-user's selection of one of the end-users from the third list (block 245). Specifically, if first end-user selects an end-user from the third list, then the program code will determine that the peer mobile computing device of the end-user selected, is the destination to which to transfer the copy of information to complete the action.

Next, the program code generates a request for the end-user selected, wherein the request allows the end-user selected to decline the transfer of the copy of information to complete the action (block 250). If the end-user selected declines the transfer of the copy of information to complete the action (the "YES" branch of decision block 255), then the program code determines one of the peer mobile computing devices identified as a destination to which to perform a transfer of the copy of information to complete the action, based on the first end-user's selection of one of the end-users from the third list (block 245). Otherwise, if the end-user selected does not decline the transfer of the copy of information to complete the action (the "NO" branch of decision block 255), then the program code transfers, from first mobile computing device 105a to the destination, the copy of information to complete the action (block 260). Next, the program code removes from the destination the information transferred based on the rules, if any, configured by the first end-user (block 265). As a result, access by the end-user to the information transferred is revoked, after the program code removes the information transferred from the destination. Subsequently, the program code ends.

Figure 3:
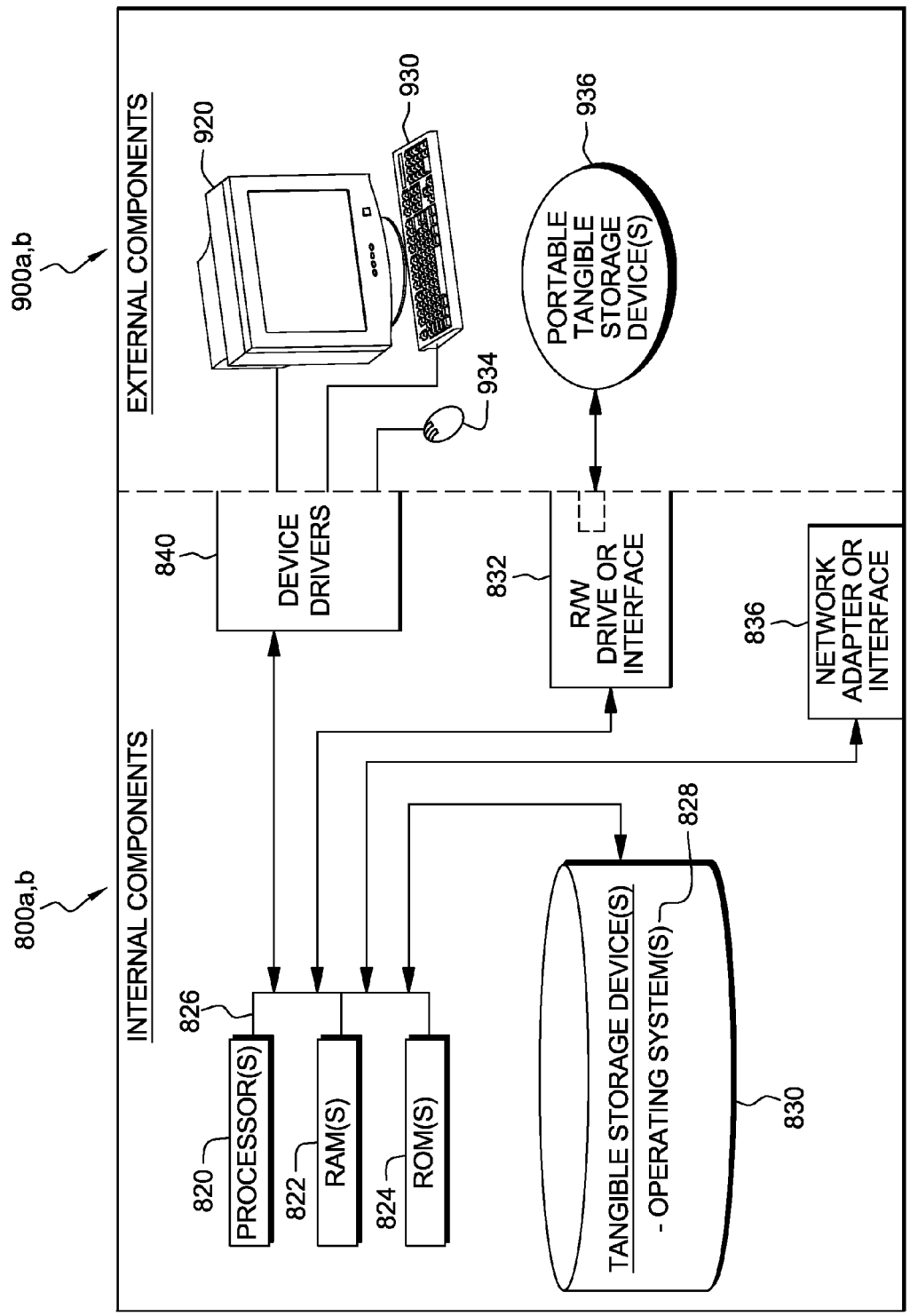
FIG. 3 is a block diagram depicting internal and external components of the first mobile computing device and the second mobile computing device of FIG. 1 according to an embodiment of the present invention.

FIG. 3 is a block diagram depicting a set of internal components 800a and 800b and a set of external components 900a and 900b that correspond to respective first mobile computing device 105a and second mobile computing device 105b. Internal components 800a and 800b each include one or more processors 820, one or more computer readable RAMs 822 and one or more computer readable ROMs 824 on one or more buses 826, and one or more operating systems 828 and one or more computer readable tangible storage devices 830. The one or more operating systems 828 and mobile computing data transfer software 110 on first mobile computing device 105a and second mobile computing device 105b are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Mobile computing data transfer software 110 on first mobile computing device 105a and second mobile computing device 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Mobile computing data transfer software 110 on first mobile computing device 105a and second mobile computing device 105b can be downloaded to respective mobile computing devices 105a and 105b from an external computer or external storage device via a network (for example, the Internet, a LAN, or a WAN) and respective network adapters or interfaces 836. From the network adapter or interface 836, mobile computing data transfer software 110 on first mobile computing device 105a and second mobile computing device 105b are loaded into at least one respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for transferring a copy of information from a first mobile computing device to a peer mobile computing device upon mobile computing data transfer software identifying a problem with the first mobile computing device that may prevent an end-user from completing an action on the first mobile computing device. Therefore, one or more embodiments of the invention have been disclosed by way of example and not limitation.

What is claimed is:

1. A computer implemented method comprising the steps of:
   monitoring available resources associated with a first mobile computing device;
   identifying a problem with the first mobile computing device based on the monitoring of the available resources, wherein the problem relates to depletion of the resources and is capable of preventing completion of an action attempted by a first end-user via the first mobile computing device;
   in response to identifying the problem, determining the first end-user wants to complete the action on a first peer mobile computing device of a second end-user;
   scanning a computer network to identify the first peer mobile computing device and other peer mobile computing devices on which to complete the action;
   granting access to a copy of information to complete the action on the first peer mobile computing device; and
   revoking access to the copy of information.

2. The method of claim 1, wherein the step of scanning comprises displaying on the first mobile computing device a first list that includes the peer mobile computing device and the other peer mobile computing devices identified.

3. The method of claim 1, wherein the step of granting access to the copy of information comprises transferring the copy of information to a destination that includes at least one of the first peer mobile computing device identified and a computer managed by a data storage cloud service provider.

4. The method of claim 1, wherein the copy of information comprises at least one of one or more contacts of the first end-user, a set of mobile computing software applications from the first mobile computing device, textual data, and a file from the first mobile computing device to complete the action on the first peer mobile computing device of the second end-user.

5. The method of claim 1, wherein the step of revoking access to the copy of information comprises removing the copy of information from at least one of the first peer mobile computing device identified and a computer managed by a data storage cloud service provider.

6. The method of claim 1, wherein the resources include at least one of battery level and minutes, and wherein the step of granting access to the copy of information comprises receiving an input from the first end-user specifying types of information to include in the copy of information.

7. The method of claim 6, wherein the step of revoking access to the copy of information comprises:
   receiving preferences that define a time at which the copy of information is subsequently removed from the first peer mobile computing device; and
   removing the copy of information from the first peer mobile computing device based on the preferences that define the time at which the copy of information is subsequently removed from the first peer mobile computing device.

8. The method of claim 7, wherein the step of granting access to the copy of information comprises receiving a selection from the first end-user to grant access to the copy of the information to the first peer mobile computing device, wherein receiving the selection from the first end-user includes receiving a selection identifying an end-user associated with the first peer mobile computing device.

9. A computer program product comprising:
   a computer readable storage medium and program instructions stored on the computer readable storage medium, the program instructions comprising:
   program instructions to monitor available resources associated with a first mobile computing device;
   program instructions to identify a problem with the first mobile computing device based on the monitoring of the available resources, wherein the problem relates to depletion of the resources and is capable of preventing completion of an action attempted by a first end-user via the first mobile computing device;
   program instructions to determine the first end-user wants to complete the action on a first peer mobile computing device of a second end-user, based on the program instructions to identify the problem with the first mobile computing device;
   program instructions to scan a computer network to identify the first peer mobile computing device and other peer mobile computing devices on which to complete the action;
   program instructions to grant access to a copy of information to complete the action on the first peer mobile computing device; and
   program instructions to revoke access to the copy of information.

10. The computer program product of claim 9, wherein the step of scanning comprises displaying on the first mobile computing device a first list that includes the peer mobile computing device and the other peer mobile computing devices identified.

11. The computer program product of claim 9, wherein the step of granting access to the copy of information comprises transferring the copy of information to a destination that includes, at least one of the first peer mobile computing device identified and a computer managed by a data storage cloud service provider.

12. The computer program product of claim 9, wherein the copy of information comprises at least one of one or more contacts of the first end-user, a set of mobile computing software applications from the first mobile computing device, textual data, and a file from the first mobile computing device to complete the action on the first peer mobile computing device of the second end-user.

13. The computer program product of claim 9, wherein the step of revoking access to the copy of information comprises removing the copy of information from at least one of the first peer mobile computing device identified and a computer managed by a data storage cloud service provider.

14. The method of claim 9, wherein the resources include at least one of battery level and minutes, and
   wherein the step of granting access to the copy of information comprises:
   receiving an input from the first end-user specifying types of information to include in the copy of information, and
   receiving a selection from the first end-user to grant access to the copy of the information to the first peer mobile computing device, wherein receiving the selection from the first end-user includes receiving a selection identifying an end-user associated with the first peer mobile computing device.

15. A computer system comprising:
   one or more processors, one or more computer readable memories, one or more computer readable storage media, and program instructions stored on the one or more storage media for execution by the one or more processors via the one or more memories, the program instructions comprising:

program instructions to monitor available resources associated with a first mobile computing device;

program instructions to identify a problem with the first mobile computing device based on the monitoring of the available resources, wherein the problem relates to depletion of the resources and is capable of preventing completion of an action attempted by a first end-user via the first mobile computing device;

program instructions to determine the first end-user wants to complete the action on a first peer mobile computing device of a second end-user, based on the program instructions to identify the problem with the first mobile computing device;

program instructions to scan a computer network to identify the first peer mobile computing device and other peer mobile computing devices on which to complete the action;

program instructions to grant access to a copy of information to complete the action on the first peer mobile computing device; and program instructions to revoke access to the copy of information.

16. The computer system of claim 15, wherein the step of scanning comprises displaying on the first mobile computing device a first list that includes the peer mobile computing device and the other peer mobile computing devices identified.

17. The computer system of claim 15, wherein the step of granting access to the copy of information comprises transferring the copy of information to a destination that includes at least one of the first peer mobile computing device identified and a computer managed by a data storage cloud service provider.

18. The computer system of claim 15, wherein the copy of information comprises at least one of one or more contacts of the first end-user, a set of mobile computing software applications from the first mobile computing device, textual data, and a file from the first mobile computing device to complete the action on the first peer mobile computing device of the second end-user.

19. The computer system of claim 15, wherein the step of revoking access to the copy of information comprises removing the copy of information from at least one of the first peer mobile computing device identified and a computer managed by a data storage cloud service provider.

20. The method of claim 15, wherein the resources include at least one of battery level and minutes,
wherein the step of granting access to the copy of information comprises receiving an input from the first end-user specifying types of information to include in the copy of information, and
wherein the step of revoking access to the copy of information comprises:
receiving preferences that define a time at which the copy of information is subsequently removed from the first peer mobile computing device; and
removing the copy of information from the first peer mobile computing device based on the preferences that define the time at which the copy of information is subsequently removed from the first peer mobile computing device.

* * * * *